United States Patent
White

(10) Patent No.: US 11,966,375 B2
(45) Date of Patent: Apr. 23, 2024

(54) ENABLING COMMUNICATION BETWEEN MULTIPLE DATABASES HAVING DISPARATE INDICES

(71) Applicant: Hop.dev, Inc., San Francisco, CA (US)

(72) Inventor: Kristopher White, San Francisco, CA (US)

(73) Assignee: Hop.dev, Inc., San Francisco, CA (US)

( * ) Notice: Subject to any disclaimer, the term of this patent is extended or adjusted under 35 U.S.C. 154(b) by 68 days.

(21) Appl. No.: 17/849,503

(22) Filed: Jun. 24, 2022

(65) Prior Publication Data
US 2023/0385259 A1    Nov. 30, 2023

Related U.S. Application Data

(60) Provisional application No. 63/345,553, filed on May 25, 2022.

(51) Int. Cl.
*G06F 7/00* (2006.01)
*G06F 16/22* (2019.01)
*G06F 16/27* (2019.01)

(52) U.S. Cl.
CPC .......... *G06F 16/2228* (2019.01); *G06F 16/27* (2019.01)

(58) Field of Classification Search
CPC .............................. G06F 16/27; G06F 16/2228
USPC .................................................. 707/600–899
See application file for complete search history.

(56) References Cited

U.S. PATENT DOCUMENTS

| | | | |
|---|---|---|---|
| 10,614,430 B2 | 4/2020 | Armstrong | |
| 10,805,315 B2 | 10/2020 | Kirkham et al. | |
| 11,257,010 B2 | 2/2022 | Blecharczyk et al. | |
| 2005/0055355 A1* | 3/2005 | Murthy | ................... G06F 16/84 |
| 2020/0183414 A1 | 6/2020 | Shih et al. | |
| 2020/0202579 A1 | 6/2020 | Caballero et al. | |

* cited by examiner

*Primary Examiner* — Isaac M Woo
(74) *Attorney, Agent, or Firm* — PERKINS COIE LLP

(57) ABSTRACT

The system creates a central UUID index mapping multiple local identifiers of multiple records in multiple databases to an identifier unique across the multiple databases including a first database without a UUID index. The first database includes a record having a first identifier. A second database includes an equivalent record having a second identifier different from the first identifier. The universally unique identifier in the central UUID index represents the first and the second identifier. The system receives a request from the first database to obtain an equivalent record from the second database, where the request includes an identifier of a record in the first database. The system determines that the identifier is a local identifier unique to the first database, based on the central UUID index. The system then converts the local identifier to the universally unique identifier, and sends the universally unique identifier to the first database.

20 Claims, 7 Drawing Sheets

ENABLING COMMUNICATION BETWEEN MULTIPLE DATABASES HAVING DISPARATE INDICES

CROSS-REFERENCE TO RELATED APPLICATIONS

This application claims priority to the U.S. provisional patent application Ser. No. 63/345,553 filed May 25, 2022, which is incorporated herein by reference in its entirety.

BACKGROUND

A disparate system, or a disparate data system, is a computer data processing system that is designed to operate independently of other computer data processing systems and to operate as a fundamentally distinct system. A problem arises when multiple disparate databases need to communicate with each other, but they do not know each other's record nomenclature.

BRIEF DESCRIPTION OF THE DRAWINGS

Detailed descriptions of implementations of the present invention will be described and explained through the use of the accompanying drawings.

Figure 1:
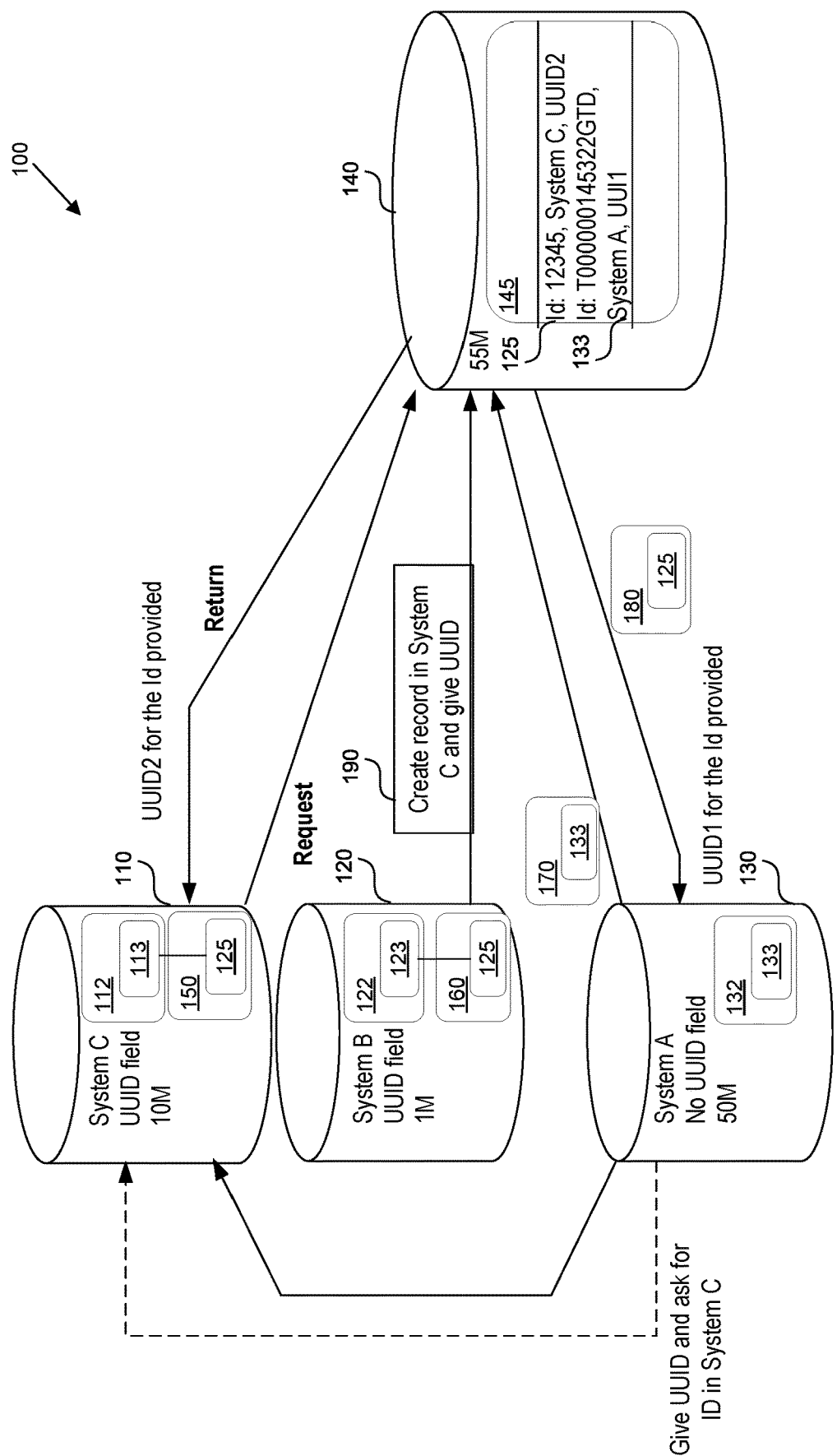
FIG. 1 shows a system providing a central universally unique identifier (UUID) index.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system enables communication between multiple databases. The system can create a central universally unique identifier index, where the central universally unique identifier index maps multiple local identifiers associated with multiple records in the multiple databases to a universally unique identifier. The universally unique identifier is unique across the multiple databases. The multiple databases include a first database without a universally unique identifier index. The first database among the multiple databases includes a record having a first identifier. A second database among the multiple databases includes an equivalent record having a second identifier, where the first identifier and the second identifier are different, and the equivalent record in the second database includes information about a same event as the record in the first database. The universally unique identifier in the central universally unique identifier index represents the first identifier and the second identifier.

The system can receive a request from a first database among the multiple databases to obtain an equivalent record from a second database among the multiple databases, where the request includes the first identifier associated with the record in the first database. The system can determine whether the identifier is a local identifier unique to the first database. Upon determining that the identifier is the local identifier unique to the first database, based on the central universally unique identifier index, the system converts the local identifier to a first unique identifier. The system can send the first unique identifier to the first database.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Enabling Communication Between Multiple Databases Having Disparate Indices

FIG. 1 shows a system providing a central universally unique identifier (UUID) index. The system 100 can include multiple databases 110, 120, 130, and a server 140 providing central UUID index 145.

The multiple databases 110, 120, 130 can store millions of records 112, 122, 132, each of which has a unique local identifier (ID) 113, 123, 133, even if the records 112, 122, 132 are equivalent to each other. The unique local IDs 113, 123, 133 are unique to their respective databases 110, 120, 130, but may or may not be unique to the whole system including the multiple databases 110, 120, 130. Equivalent records in different databases 110, 120, 130 do not store the same information, but they are related to each other because they contain different information related to the same event, such as a visit to a doctor's office. For example, the database 110 can store information about a doctor in the record 112, the database 120 can store information about the patient in the record 122, and the database 130 can store the invoices generated from the patient's visit to the doctor in the record 132. Consequently, the databases 110, 120, 130, even though they store equivalent information, cannot communicate with each other because databases 120, 130 do not know the unique local identifier 113 associated with the record 112 stored in the database 110.

To solve this problem, the system 100 generates a UUID index 145 that uniquely identifies each record 112, 122, 132 across all the databases 110, 120, 130. The records 112, 122, 132 that are equivalent to each other can have the same UUID 125. The UUID index 145 can include the unique local ID 113, 123, 133 for all records 112, 122, 132 in all databases 110, 120, 130, and can map the unique local ID to the corresponding UUID 125, which is unique across all the databases 110, 120, 130. For example, as shown in FIG. 1, the UUID index 145 can include the value of ID 133, which can be T000000145322GTD, System A, UUI1, and can map the ID 133 to UUID 125 having the value of 12345, System C, UUID2.

Modern databases 110, 120 can store the UUID index 150, 160 of the records contained in the databases 110, 120 directly in the database 110, 120, respectively. The modern databases 110, 120 can include a Salesforce database, Redshift, Snowflake, MySQL, Postgres, etc. By storing the UUID index 150, 160 directly in the database, the databases 120, 130 can communicate directly with each other. For example, if the database 120 wants to retrieve the record 132 equivalent to the record 122, the database 120 can obtain the UUID 125 of the record 122 from the UUID index 150, and can query the database 130 for the record having the UUID 125. Upon receiving the query, the database 130 can return the record having the UUID 125, namely the record 132.

A unique aspect of the system 100 is that it can enable modern databases 110, 120 to communicate with legacy databases 130. The database 130 can be a legacy database, such as a mainframe database including DB2, IMS, CA Datacom, CA IDMS, SQL/DS and Adabas, that cannot store the UUID index equivalent to UUID indices 150, 160. Consequently, the database 130 cannot retrieve equivalent records 122, 132 by interacting with the databases 110, 120. Instead, the database 130 can send a request 170 to the server 140 storing the central UUID index 145. The request 170 can include the ID 133 of the record 132. The ID 133 can have the value of T000000145322GTD, System A, UUI1.

The server 140 can respond to the request 170 by sending the response 180, including the UUID 125 of the ID 133 to the database 130. The records 112, 122, 132 can have the same UUID 125 because the records are equivalent. The UUID 125 can have the value of 12345, System C, UUID2. Upon receiving the new UUID 125 of the equivalent records 112, 122, the database 130 can then directly interact with the databases 110, 120 based on the UUID 125. Alternatively, the database 130 can interact with the databases 110, 120 through the server 140. For example, the database 130 can request the ID in the database 110, 120 of a record having the UUID 125.

Databases 110, 120, 130 can interact with each other through the server 140. For example, the database 120 can send a request 190 to create a record in the database 110, 130 based on the UUID 125. Similarly, the databases 120, 130 can interact with the other databases 110, 120, 130 using the server 140 by supplying the local ID 123, 133 and asking for the corresponding UUID 125.

In the disclosed system 100, the databases 110, 120 may or may not store the UUID indices 150, 160 locally. If the UUID indices 150, 160 are not stored locally, the databases 110, 120 can query the server 140 for the UUID of a local ID 113, 123. The system 100 can have a single central UUID index 145, or a limited number of UUID indices, namely, one central UUID index 145 and one UUID index 150, 160 for each database 110, 120. By contrast, other systems in addition to the UUID indices 145, 150, 160 can have multiple UUID indices for each database. For example, in other systems the database 110 can have a UUID index for records contained in the database 110, a second UUID index for records contained in the database 120, and a third UUID index for records contained in the database 130. If there are 20 mutually communicating databases, each database in the system can have 20 UUID indices, for a total of 400 indices. By contrast, the disclosed system 100 would have one or at most 21 UUID indices. The significantly lower number of UUID indices uses less memory, makes updating the UUID indices 145, 150, 160 computationally cheaper, and is less prone to error.

Further, if a database 110 wants to regenerate local IDs 113 with the current system, updating needs to occur only for the central UUID index 145 and/or the UUID index 150, if the database 110 has a local UUID index 150. By contrast, in other systems, if the database 110 regenerates the local IDs 113, all the UUID indices in the databases 120, 130 need to be regenerated in addition to updating the local IDs 113. If there are 20 mutually communicating databases, the current system needs to perform either one or at most two updates to two UUID indices 145, 150. By contrast, other systems would need to perform 21 UUID index updates. Consequently, the disclosed system reduces computation time and is less prone to error.

Figure 2:
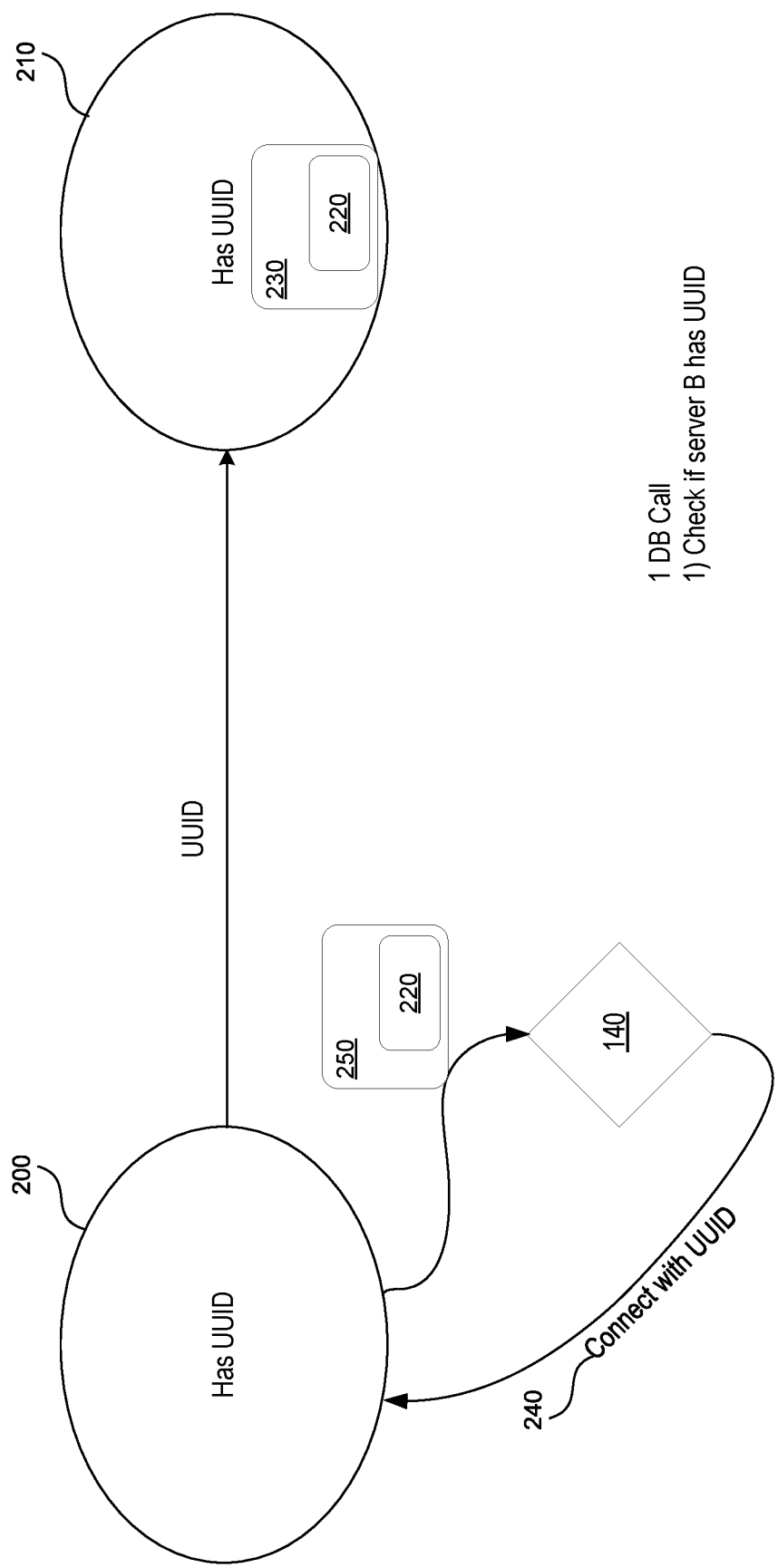
FIG. 2 shows two databases communicating with each other, where each database has a local UUID index.

FIG. 2 shows two databases 200, 210 communicating with each other, where each database has a local UUID index. The database 200 may want to request a record having the UUID 220 from the database 210. Prior to initiating communication with the database 210, the database 200 can send a message 250 to the server 140 querying whether the database 210 has a local UUID index 230. Since the database 210 has the local UUID index 230, the server 140 can send a confirmation 240 to the database 200 to communicate with the database 210 using the UUID 220. Upon receiving the confirmation 240, the database 200 can request the record having the UUID 220 from the database 210.

Figure 3:
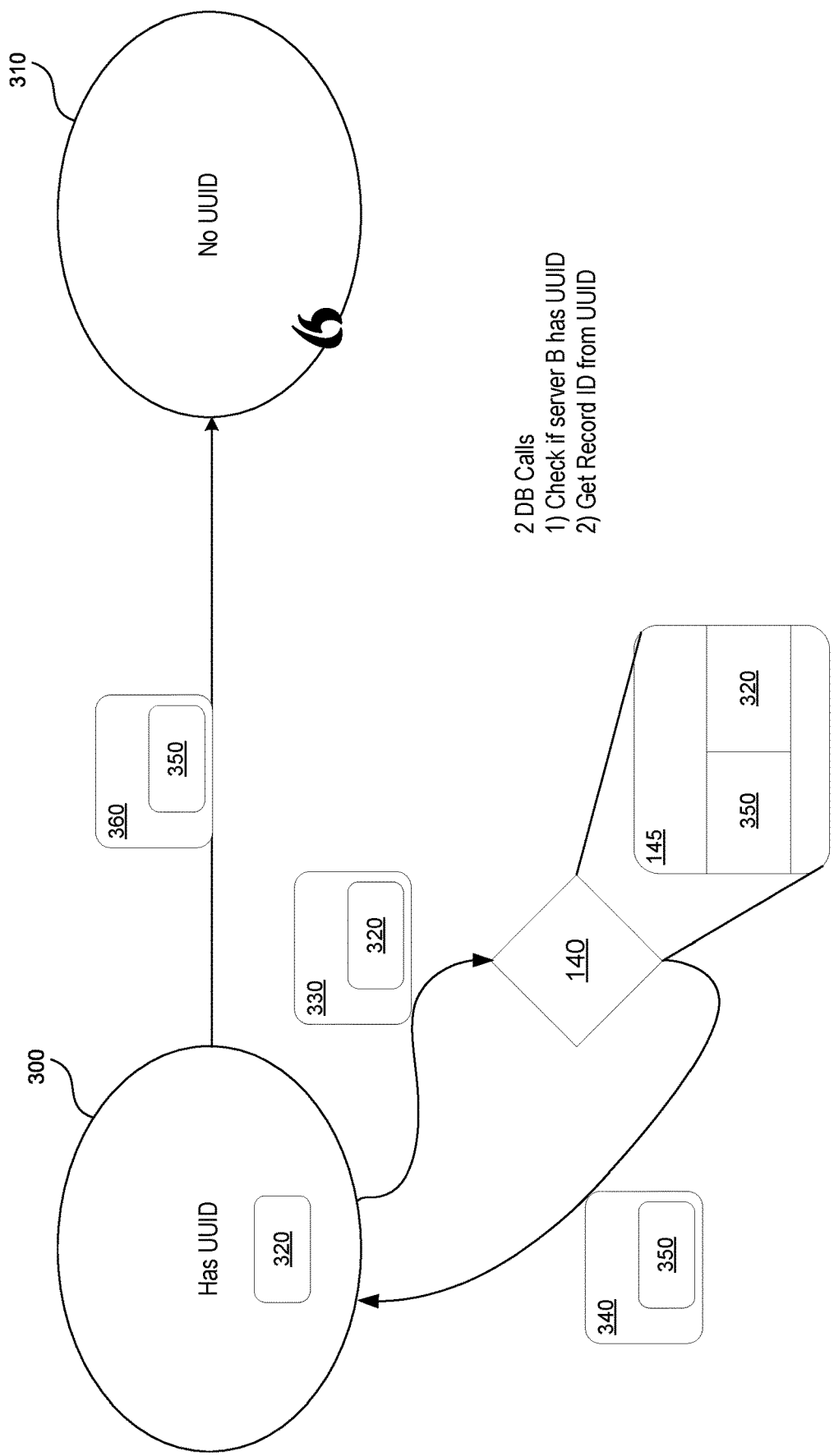
FIG. 3 shows two databases communicating with each other, where the database receiving the request does not have a local UUID index.

FIG. 3 shows two databases 300, 310 communicating with each other, where the database receiving the request does not have a local UUID index. The database 300 may want to request a record having the UUID 320 from the database 310. Prior to initiating communication with the database 310, the database 300 can send a message 330 to the server 140 querying whether the database 310 has a local UUID index including the UUID 320.

The server 140 can confirm that the database 310 does not have a local UUID index, and can use the central UUID index 145 to determine the local ID 350 corresponding to the UUID 320. The server 140 can send a response 340 including an indication that the database 310 does not have a local UUID index, and also including the ID 350 unique and local to the database 310 and corresponding to the UUID 320. Upon receiving the response 340, the database 300 can send a request 360 including the ID 350 to the database 310. The database 310 can then respond with the contents of the record having the local ID 350.

Figure 4:
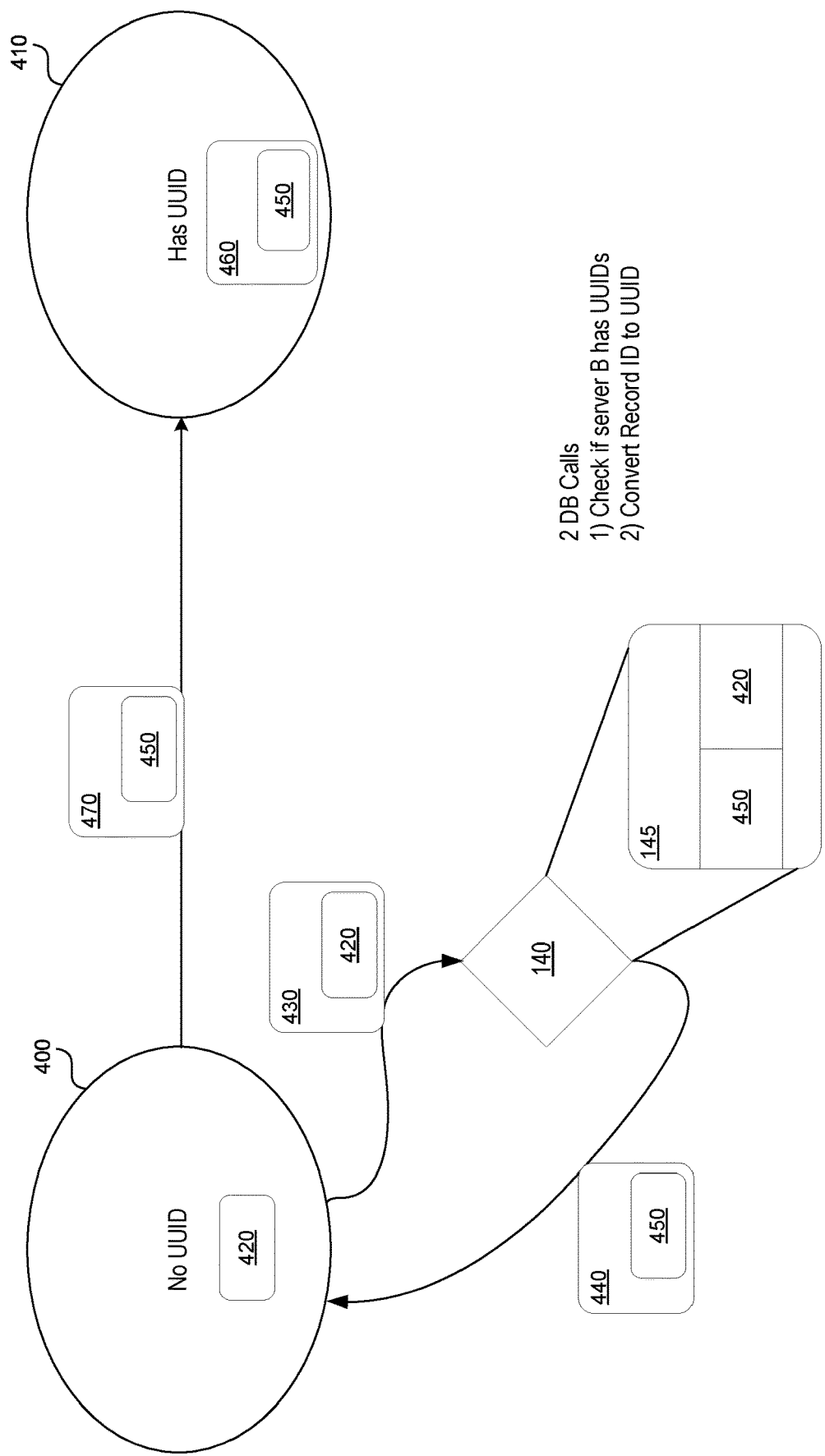
FIG. 4 shows two databases communicating with each other, where the database initiating the request does not have a local UUID index.

FIG. 4 shows two databases 400, 410 communicating with each other, where the database initiating the request does not have a local UUID index. The database 400 may want to request a record from the database 410 equivalent to a record having a local ID 420. However, the database 410 does not recognize the local ID 420. Consequently, the database 400 sends a request 430 to the server 140. The request 430 includes the local ID 420 of the record in the database 400.

The server 140 can use the central UUID index 145 to determine the UUID 450 corresponding to the local ID 420. The server 140 can send a response 440 including an indication that the database 410 has a local UUID index 460, and also including the UUID 450 corresponding to the equivalent record in the database 410. Upon receiving the response 440, the database 400 can send a request 470 including the UUID 450 to the database 410. The database 410 can respond with the contents of the record having the UUID 450.

Figure 5:
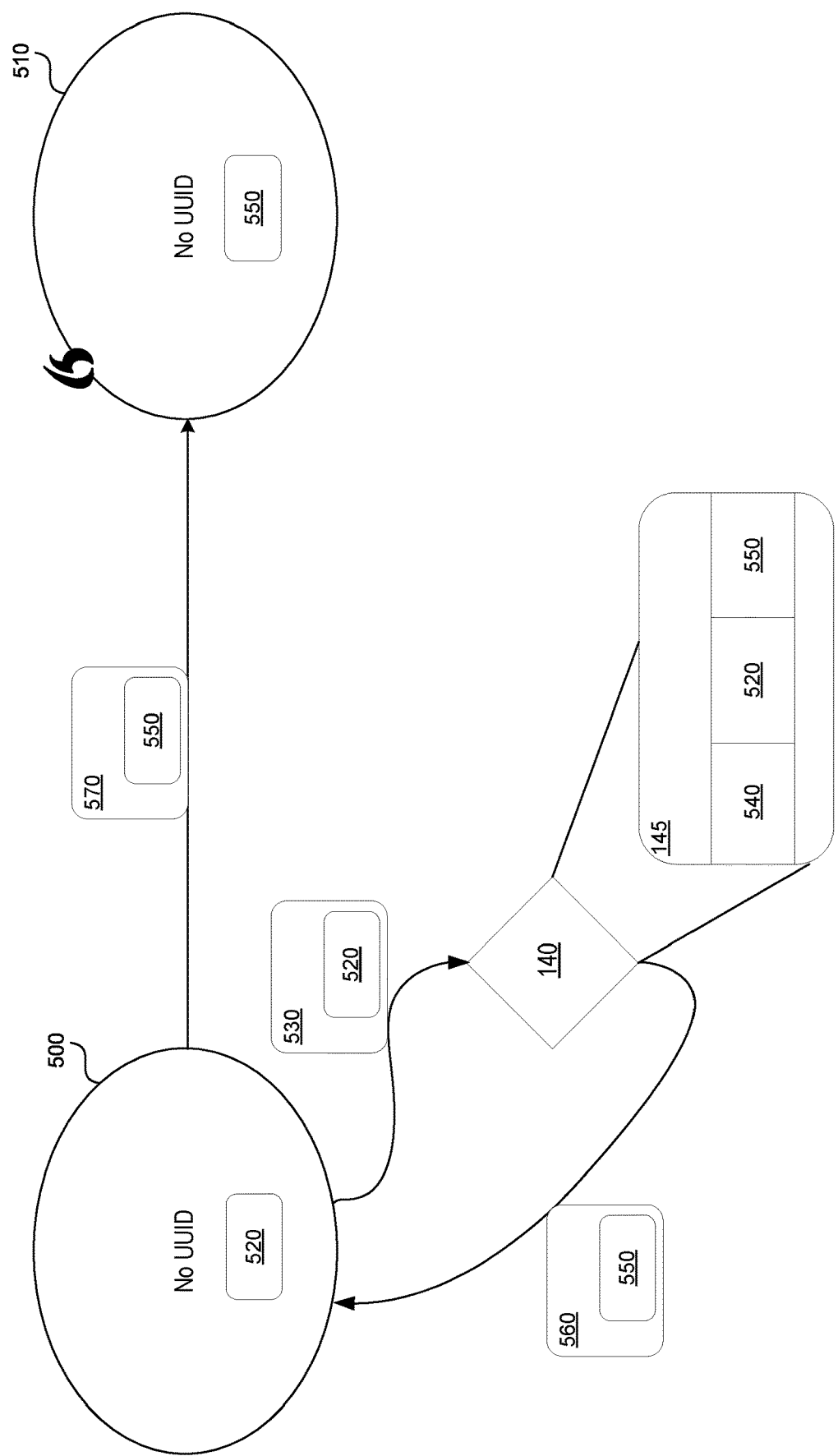
FIG. 5 shows two databases, neither of which has a local UUID index.

FIG. 5 shows two databases 500, 510, neither of which has a local UUID index. The database 500 may want to request a record from the database 510 equivalent to a record having a local ID 520. However, the database 510 does not recognize the local ID 520. Consequently, the database 500 can send a request 530 to the server 140. The request 530 can include the local ID 520 of the record in the database 500.

The server 140, based on the local ID 520, can determine the UUID 540 associated with the local ID 520. The server 140 can also determine that the database 510 does not have the local UUID index and can determine, using the central UUID index 145, the local ID 550 of the equivalent record in the database 510.

The server 140 can send a response 560 including an indication that the database 510 does not have a local UUID index, and also including the local ID 550 of the equivalent record in the database 510. Upon receiving the response 560, the database 500 can send a request 570 including the local ID 550 to the database 510. The database 510 can respond with the record having the local ID 550.

Figure 6:
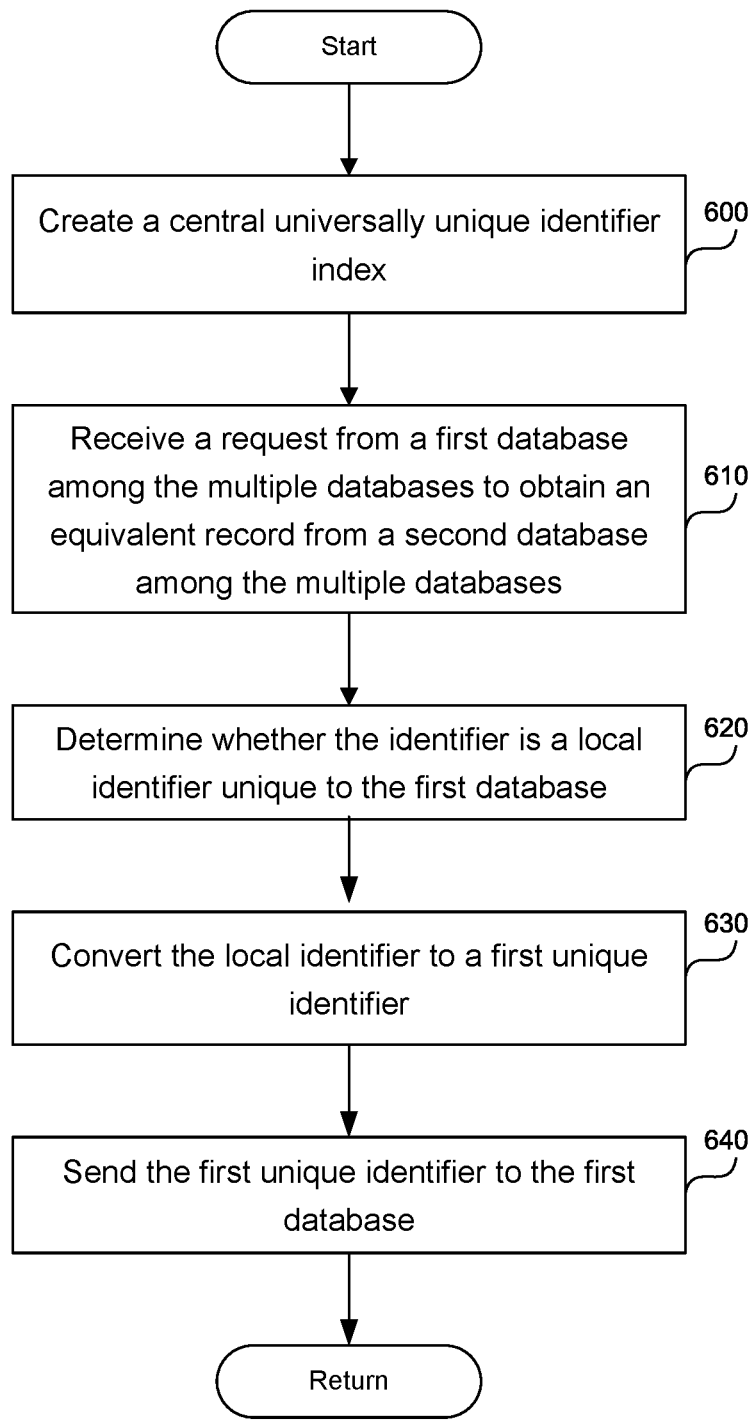
FIG. 6 is a flowchart to enable communication between multiple databases having disparate indices.

FIG. 6 is a flowchart to enable communication between multiple databases having disparate indices. In step 600, a hardware or software processor executing instructions described in this application can create a central universally unique identifier index mapping multiple local identifiers associated with multiple records in the multiple databases to a universally unique identifier, which is unique across the multiple databases. The multiple databases can include a first database including a record having a first identifier, and a second database including an equivalent record having a second identifier. The equivalent record in the second database includes information about a same event as the record in the first database. The first database may not include a first universally unique identifier index. For example, the first database may be a legacy database. The first identifier and the second identifier can be different. The universally unique identifier in the central universally unique identifier index can relate the first identifier and the second identifier by mapping the first identifier to the second identifier, and vice versa.

In step 610, the processor can receive a request from the first database among the multiple databases to obtain the equivalent record from the second database among the multiple databases. The request can include the first identifier associated with the record in the first database. The identifier can be a universally, that is globally, unique identifier, or can be a local identifier new to the first database.

In step 620, the processor can determine whether the identifier is a local identifier unique to the first database. To make the determination, the processor can compare the identifier to the central universally unique identifier index, and determine whether the identifier is globally unique, or specific to the first database.

In step 630, upon determining that the identifier is the local identifier unique to the first database, based on the central universally unique identifier index, the processor can convert the local identifier to a first unique identifier. In step 640, the processor can send the first unique identifier to the first database.

The processor can reduce a memory footprint of the UUID indices by creating at most the central universally unique identifier index and multiple universally unique identifier indices, where one, e.g., a first, universally unique identifier index among the multiple universally unique identifier indices corresponds to one, e.g., a first, database among the multiple databases. In other words, the number of universally unique identifier indices is the same as the number of multiple databases. Each universally unique identifier index can map a multiplicity of local identifiers associated with a first multiplicity of records in the first database to a first multiplicity of universally unique identifiers. The first multiplicity of universally unique identifiers are unique across the multiple databases. The first multiplicity of universally unique identifiers can be stored at the first database. The processor can receive an indication that the first multiplicity of local identifiers changed. The processor can reduce processor cycles needed to propagate the change by updating at most the central universally unique identifier index. In other words, in the current system, the processor can update only one universally unique identifier index, namely, the central universally unique identifier index. By contrast, in other database systems having N databases, each database stores N universally unique identifier indices, one for each database in the system. In that case, to update the local indices in one database requires at least N updates to N other indices.

The processor can receive a message from the second database querying whether the first database includes a first universally unique identifier index mapping a first multiplicity of local identifiers associated with a first multiplicity of records in the first database to a first multiplicity of universally unique identifiers. The second database can include a second universally unique identifier index mapping a second multiplicity of local identifiers associated with the second multiplicity of records in the second database to a second multiplicity of universally unique identifiers. The second multiplicity of universally unique identifiers are unique across the multiple databases. The processor can determine whether the first database includes the first multiplicity of universally unique identifiers. Upon determining that the first database includes the first multiplicity of universally unique identifiers, the processor can send a confirmation to the second database that the first database includes the first multiplicity of universally unique identifiers.

The processor can receive a message from the second database querying whether the first database includes a first universally unique identifier index mapping a first multiplicity of local identifiers associated with a first multiplicity of records in the first database to a first multiplicity of universally unique identifiers. The second database can include a second universally unique identifier index mapping a second multiplicity of local identifiers associated with the second multiplicity of records in the second database to a second multiplicity of universally unique identifiers. The second multiplicity of universally unique identifiers are unique across the multiple databases. The message can include a second universally unique identifier among the second multiplicity of universally unique identifiers. The second universally unique identifier identifies a second record among the second multiplicity of records and a first equivalent record associated with the first database. The second universally unique identifier is unique across the multiple databases. The processor can determine whether the first database includes the first multiplicity of universally unique identifiers. Upon determining that the first database does not include the first multiplicity of universally unique identifiers, based on the second universally unique identifier, the processor can retrieve from the central universally unique identifier index a first local identifier of the first equivalent record associated with the first database. The processor can send to the second database a message including the first local identifier and an indication that the first database does not include the first multiplicity of universally unique identifiers.

The processor can receive a message from the first database querying whether the second database includes a second universally unique identifier index mapping a second multiplicity of local identifiers associated with a second multiplicity of records in the second database to a second multiplicity of universally unique identifiers. The message can include the first identifier associated with the record in the first database. The multiple databases include a first database without a first universally unique identifier index. In other words, the first database can include an index of local identifiers associated with local records. The processor can determine whether the second database includes the second universally unique identifier index. Upon determining that the second database includes the second universally unique identifier index, based on the central universally unique identifier index, the processor can retrieve from the central universally unique identifier index a second universally unique identifier associated with the identifier. The processor can send to the first database a message including the second universally unique identifier and an indication that the second database includes the second universally unique identifier index.

The processor can receive a message from the first database querying whether the second database includes a second universally unique identifier index mapping a second multiplicity of local identifiers associated with a second multiplicity of records in the second database to a second multiplicity of universally unique identifiers. The message can include the first identifier associated with the record in the first database. The first database can contain only local indices, and can be without a first universally unique identifier index. The first identifier associated with the record in the first database can be a local identifier. The processor can determine whether the second database includes the second universally unique identifier index. Upon determining that the second database does not include the second universally unique identifier index, based on the central universally unique identifier index, the processor can retrieve from the central universally unique identifier index a second local identifier associated with the identifier, where the second local identifier uniquely identifies the equivalent record in the second database. The processor can send to the first database a message including the second local identifier and an indication that the second database does not include the second universally unique identifier index.

Computer System

Figure 7:
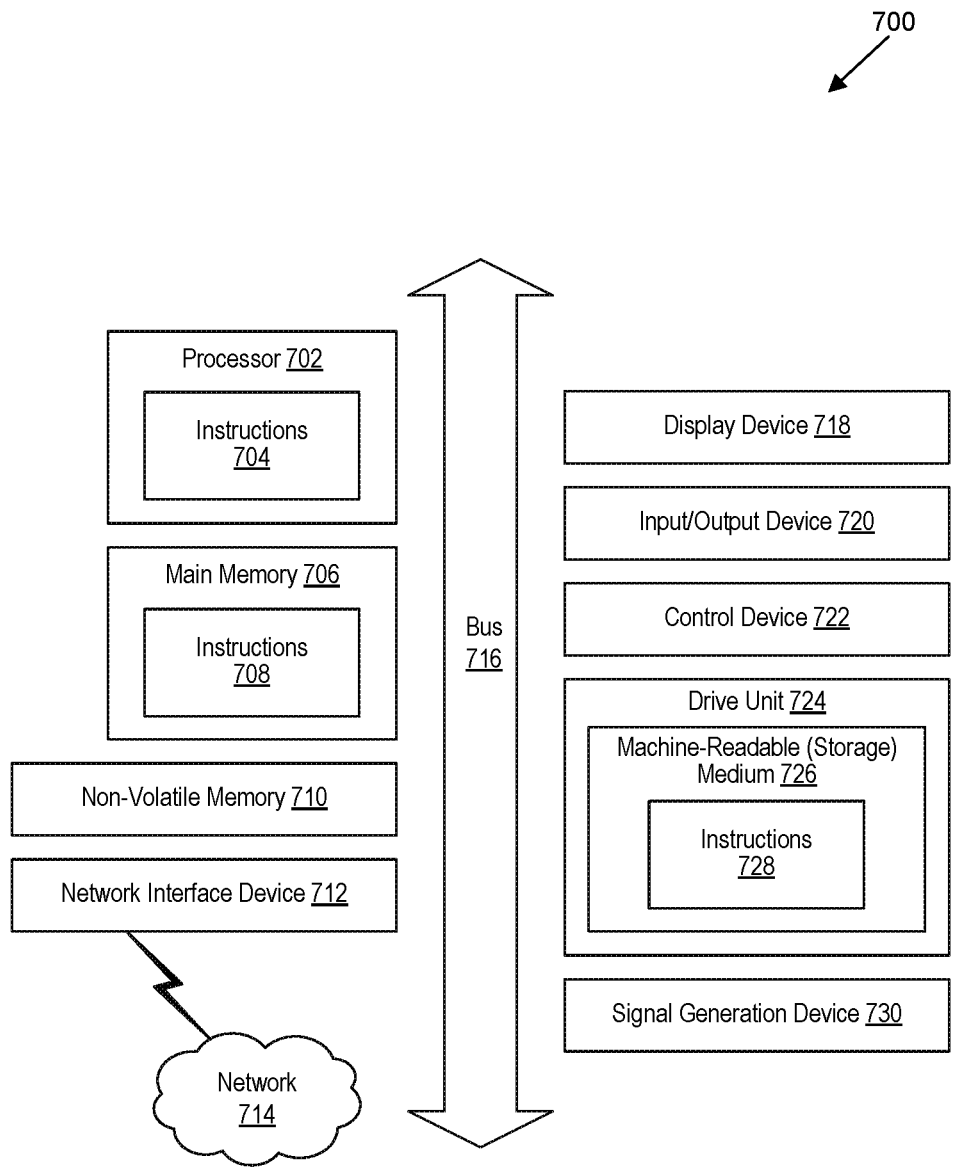
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, near real time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references can mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. At least one computer-readable storage medium, excluding transitory signals and carrying instructions to enable communication between multiple databases, which, when executed by at least one data processor of a system, cause the system to:

create a central universally unique identifier index,
wherein the central universally unique identifier index maps multiple local identifiers associated with multiple records in the multiple databases to a universally unique identifier,
wherein the universally unique identifier is unique across the multiple databases,
wherein the multiple databases include a first database without a first universally unique identifier index,
wherein the first database among the multiple databases includes a record having a first identifier,
wherein a second database among the multiple databases includes an equivalent record having a second identifier,
wherein the first identifier and the second identifier are different,
wherein the equivalent record in the second database includes information about a same event as the record in the first database, and
wherein the universally unique identifier in the central universally unique identifier index relates the first identifier and the second identifier;
receive a request from the first database among the multiple databases to obtain the equivalent record from the second database among the multiple databases, wherein the request includes the first identifier associated with the record in the first database;
determine whether the first identifier is a local identifier unique to the first database;
upon determining that the first identifier is the local identifier unique to the first database, based on the central universally unique identifier index, convert the local identifier to the universally unique identifier; and
send the universally unique identifier to the first database.

2. The computer-readable storage medium of claim 1, comprising instructions to:
receive a message from the second database querying whether the first database includes the first universally unique identifier index mapping a first multiplicity of local identifiers associated with a first multiplicity of records in the first database to a first multiplicity of universally unique identifiers,
wherein the second database includes a second universally unique identifier index mapping a second multiplicity of local identifiers associated with a second multiplicity of records in the second database to a second multiplicity of universally unique identifiers,
wherein the second multiplicity of universally unique identifiers are unique across the multiple databases,
wherein the message includes a second universally unique identifier among the second multiplicity of universally unique identifiers,
wherein the second universally unique identifier identifies a second record among the second multiplicity of records and a first equivalent record associated with the first database,
wherein the second universally unique identifier is unique across the multiple databases;
determine whether the first database includes the first multiplicity of universally unique identifiers;
upon determining that the first database does not include the first multiplicity of universally unique identifiers, based on the second universally unique identifier, retrieve from the central universally unique identifier index a first local identifier of the first equivalent record associated with the first database; and
send to the second database a second message including the first local identifier and an indication that the first database does not include the first multiplicity of universally unique identifiers.

3. The computer-readable storage medium of claim 1, comprising instructions to:
reduce memory footprint by creating at most the central universally unique identifier index and multiple universally unique identifier indices,
wherein a third universally unique identifier index among the multiple universally unique identifier indices corresponds to a third database among the multiple databases,
wherein the third universally unique identifier index maps a third multiplicity of local identifiers associated with a third multiplicity of records in the third database to a third multiplicity of universally unique identifiers,
wherein the third multiplicity of universally unique identifiers are unique across the multiple databases,
wherein the third multiplicity of universally unique identifiers are configured to be stored at the third database;
receive an indication that the third multiplicity of local identifiers changed; and
reduce processor cycles needed to propagate the change by updating at most the central universally unique identifier index.

4. The computer-readable storage medium of claim 1, comprising instructions to:
receive a message from the second database querying whether a third database includes a third universally unique identifier index mapping a third multiplicity of local identifiers associated with a third multiplicity of records in the third database to a third multiplicity of universally unique identifiers,
wherein the second database includes a second universally unique identifier index mapping a second multiplicity of local identifiers associated with a second multiplicity of records in the second database to a second multiplicity of universally unique identifiers,
wherein the second multiplicity of universally unique identifiers are unique across the multiple databases;
determine whether the third database includes the third multiplicity of universally unique identifiers; and
upon determining that the third database includes the third multiplicity of universally unique identifiers, send a confirmation to the second database that the third database includes the third multiplicity of universally unique identifiers.

5. The computer-readable storage medium of claim 1, comprising instructions to:
receive a message from the first database querying whether the second database includes a second universally unique identifier index mapping a second multiplicity of local identifiers associated with a second multiplicity of records in the second database to a second multiplicity of universally unique identifiers,
wherein the message includes the first identifier associated with the record in the first database;
determine whether the second database includes the second universally unique identifier index;
upon determining that the second database includes the second universally unique identifier index, based on the central universally unique identifier index, retrieve from the central universally unique identifier index a second universally unique identifier associated with the first identifier; and
send to the first database a second message including the second universally unique identifier and an indication that the second database includes the second universally unique identifier index.

6. The computer-readable storage medium of claim 1, comprising instructions to:
receive a message from the first database querying whether the second database includes a second universally unique identifier index mapping a second multiplicity of local identifiers associated with a second multiplicity of records in the second database to a second multiplicity of universally unique identifiers,
wherein the message includes the first identifier associated with the record in the first database;
determine whether the second database includes the second universally unique identifier index;
upon determining that the second database does not include the second universally unique identifier index, based on the central universally unique identifier index, retrieve from the central universally unique identifier index a second local identifier associated with the first identifier,
wherein the second local identifier uniquely identifies the equivalent record in the second database; and send to the first database a second message including the second local identifier and an indication that the second database does not include the second universally unique identifier index.

7. The computer-readable storage medium of claim 1, comprising instructions to:
reduce memory footprint by creating at most the central universally unique identifier index and multiple universally unique identifier indices,
wherein a third universally unique identifier index among the multiple universally unique identifier indices corresponds to a third database among the multiple databases,
wherein the third universally unique identifier index maps a third multiplicity of local identifiers associated with a third multiplicity of records in the third database to a third multiplicity of universally unique identifiers,
wherein the third multiplicity of universally unique identifiers are configured to be stored at the third database.

8. A system comprising:
at least one hardware processor; and
at least one non-transitory memory storing instructions, which, when executed by the at least one hardware processor, cause the system to:
create a central universally unique identifier index,
wherein the central universally unique identifier index maps multiple local identifiers associated with multiple records in multiple databases to a universally unique identifier,
wherein the universally unique identifier is unique across the multiple databases,
wherein the multiple databases include a first database including a record having a first identifier, and a second database including an equivalent record having a second identifier,
wherein the first identifier and the second identifier are different, and
wherein the universally unique identifier in the central universally unique identifier index relates the first identifier and the second identifier;
receive a request from the first database among the multiple databases to obtain the equivalent record from the second database among the multiple databases,
wherein the request includes the first identifier associated with the first database;
determine whether the first identifier is a local identifier unique to the first database;
upon determining that the first identifier is the local identifier unique to the first database, based on the central universally unique identifier index, convert the local identifier to the universally unique identifier; and
send the universally unique identifier to the first database.

9. The system of claim 8, comprising instructions to:
reduce memory footprint by creating at most the central universally unique identifier index and multiple universally unique identifier indices,
wherein a first universally unique identifier index among the multiple universally unique identifier indices corresponds to the first database among the multiple databases,
wherein the first universally unique identifier index maps a first multiplicity of local identifiers associated with a first multiplicity of records in the first database to a first multiplicity of universally unique identifiers,
wherein the first multiplicity of universally unique identifiers are unique across the multiple databases,
wherein the first multiplicity of universally unique identifiers are configured to be stored at the first database;
receive an indication that the first multiplicity of local identifiers changed; and
reduce processor cycles needed to propagate the change by updating at most the central universally unique identifier index.

10. The system of claim 8, comprising instructions to:
reduce memory footprint by creating at most the central universally unique identifier index and multiple universally unique identifier indices,
wherein a first universally unique identifier index among the multiple universally unique identifier indices corresponds to the first database among the multiple databases,
wherein the first universally unique identifier index maps a first multiplicity of local identifiers associated with a first multiplicity of records in the first database to a first multiplicity of universally unique identifiers,
wherein the first multiplicity of universally unique identifiers are configured to be stored at the first database.

11. The system of claim 8, comprising instructions to:
receive a message from the second database querying whether the first database includes a first universally unique identifier index mapping a first multiplicity of local identifiers associated with a first multiplicity of records in the first database to a first multiplicity of universally unique identifiers,
wherein the second database includes a second universally unique identifier index mapping a second multiplicity of local identifiers associated with a second multiplicity of records in the second database to a second multiplicity of universally unique identifiers,
wherein the second multiplicity of universally unique identifiers are unique across the multiple databases;
determine whether the first database includes the first multiplicity of universally unique identifiers; and
upon determining that the first database includes the first multiplicity of universally unique identifiers, send a confirmation to the second database that the first database includes the first multiplicity of universally unique identifiers.

12. The system of claim 8, comprising instructions to:
receive a message from the second database querying whether the first database includes a first universally unique identifier index mapping a first multiplicity of local identifiers associated with a first multiplicity of records in the first database to a first multiplicity of universally unique identifiers,
wherein the second database includes a second universally unique identifier index mapping a second multiplicity of local identifiers associated with a second multiplicity of records in the second database to a second multiplicity of universally unique identifiers,
wherein the second multiplicity of universally unique identifiers are unique across the multiple databases,
wherein the message includes a second universally unique identifier among the second multiplicity of universally unique identifiers,
wherein the second universally unique identifier identifies a second record among the second multiplicity of records and a first equivalent record associated with the first database,
wherein the second universally unique identifier is unique across the multiple databases;
determine whether the first database includes the first multiplicity of universally unique identifiers;

upon determining that the first database does not include the first multiplicity of universally unique identifiers, based on the second universally unique identifier, retrieve from the central universally unique identifier index a first local identifier of the first equivalent record associated with the first database; and send to the second database a second message including the first local identifier and an indication that the first database does not include the first multiplicity of universally unique identifiers.

13. The system of claim 8, comprising instructions to:

receive a message from the first database querying whether the second database includes a second universally unique identifier index mapping a second multiplicity of local identifiers associated with a second multiplicity of records in the second database to a second multiplicity of universally unique identifiers, wherein the message includes the first identifier associated with the record in the first database;

determine whether the second database includes the second universally unique identifier index;

upon determining that the second database includes the second universally unique identifier index, based on the central universally unique identifier index, retrieve from the central universally unique identifier index a second universally unique identifier associated with the first identifier; and send to the first database a second message including the second universally unique identifier and an indication that the second database includes the second universally unique identifier index.

14. The system of claim 8, comprising instructions to:

receive a message from the first database querying whether the second database includes a second universally unique identifier index mapping a second multiplicity of local identifiers associated with a second multiplicity of records in the second database to a second multiplicity of universally unique identifiers, wherein the message includes the first identifier associated with the record in the first database;

determine whether the second database includes the second universally unique identifier index;

upon determining that the second database does not include the second universally unique identifier index, based on the central universally unique identifier index, retrieve from the central universally unique identifier index a second local identifier associated with the first identifier, wherein the second local identifier uniquely identifies the equivalent record in the second database; and send to the first database a second message including the second local identifier and an indication that the second database does not include the second universally unique identifier index.

15. A method comprising:

creating a central universally unique identifier index, wherein the central universally unique identifier index maps multiple local identifiers associated with multiple records in multiple databases to a universally unique identifier, wherein the universally unique identifier is unique across the multiple databases, wherein the multiple databases include a first database including a record having a first identifier, wherein a second database among the multiple databases includes an equivalent record having a second identifier, wherein the first identifier and the second identifier are different, and wherein the universally unique identifier in the central universally unique identifier index relates the first identifier and the second identifier;

receiving a request from the first database among the multiple databases to obtain the equivalent record from the second database among the multiple databases, wherein the request includes the first identifier associated with the record in the first database;

determining whether the first identifier is a local identifier unique to the first database;

upon determining that the first identifier is the local identifier unique to the first database, based on the central universally unique identifier index, converting the local identifier to the universally unique identifier; and sending the universally unique identifier to the first database.

16. The method of claim 15, comprising:

reducing memory footprint by creating at most the central universally unique identifier index and multiple universally unique identifier indices, wherein a first universally unique identifier index among the multiple universally unique identifier indices corresponds to the first database among the multiple databases, wherein the first universally unique identifier index maps a first multiplicity of local identifiers associated with a first multiplicity of records in the first database to a first multiplicity of universally unique identifiers, wherein the first multiplicity of universally unique identifiers are unique across the multiple databases, wherein the first multiplicity of universally unique identifiers are configured to be stored at the first database;

receiving an indication that the first multiplicity of local identifiers changed; and reducing processor cycles needed to propagate the change by updating at most the central universally unique identifier index.

17. The method of claim 15, comprising:

receiving a message from the second database querying whether the first database includes a first universally unique identifier index mapping a first multiplicity of local identifiers associated with a first multiplicity of records in the first database to a first multiplicity of universally unique identifiers, wherein the second database includes a second universally unique identifier index mapping a second multiplicity of local identifiers associated with a second multiplicity of records in the second database to a second multiplicity of universally unique identifiers, wherein the second multiplicity of universally unique identifiers are unique across the multiple databases;

determining whether the first database includes the first multiplicity of universally unique identifiers; and upon determining that the first database includes the first multiplicity of universally unique identifiers, sending a confirmation to the second database that the first database includes the first multiplicity of universally unique identifiers.

18. The method of claim 15, comprising:

receiving a message from the second database querying whether the first database includes a first universally unique identifier index mapping a first multiplicity of local identifiers associated with a first multiplicity of records in the first database to a first multiplicity of universally unique identifiers, wherein the second database includes a second universally unique identifier index mapping a second multiplicity of local identifiers associated with a second multiplicity of records in the second database to a second multiplicity of universally unique identifiers, wherein the second multiplicity of universally unique identifiers are unique across the multiple databases, wherein the message includes a second universally unique identifier among the second multiplicity of universally unique identifiers, wherein the second universally unique identifier identifies a second record among the second multiplicity of records and a first equivalent record associated with the first database, wherein the second universally unique identifier is unique across the multiple databases;

determining whether the first database includes the first multiplicity of universally unique identifiers;

upon determining that the first database does not include the first multiplicity of universally unique identifiers, based on the second universally unique identifier, retrieving from the central universally unique identifier index a first local identifier of the first equivalent record associated with the first database; and sending to the second database a second message including the first local identifier and an indication that the first database does not include the first multiplicity of universally unique identifiers.

19. The method of claim 15, comprising:

receiving a message from the first database querying whether the second database includes a second universally unique identifier index mapping a second multiplicity of local identifiers associated with a second multiplicity of records in the second database to a second multiplicity of universally unique identifiers, wherein the message includes the first identifier associated with the record in the first database;

determining whether the second database includes the second universally unique identifier index;

upon determining that the second database includes the second universally unique identifier index, based on the central universally unique identifier index, retrieving from the central universally unique identifier index a second universally unique identifier associated with the first identifier; and sending to the first database a second message including the second universally unique identifier and an indication that the second database includes the second universally unique identifier index.

20. The method of claim 15, comprising:

receiving a message from the first database querying whether the second database includes a second universally unique identifier index mapping a second multiplicity of local identifiers associated with a second multiplicity of records in the second database to a second multiplicity of universally unique identifiers, wherein the message includes the first identifier associated with the record in the first database;

determining whether the second database includes the second universally unique identifier index;

upon determining that the second database does not include the second universally unique identifier index, based on the central universally unique identifier index, retrieving from the central universally unique identifier index a second local identifier associated with the first identifier, wherein the second local identifier uniquely identifies the equivalent record in the second database; and sending to the first database a second message including the second local identifier and an indication that the second database does not include the second universally unique identifier index.

* * * * *